Aug. 20, 1957 — L. L. TOUTON — 2,803,498
AGRICULTURAL IRRIGATING SYSTEM
Filed Feb. 16, 1953 — 3 Sheets-Sheet 2
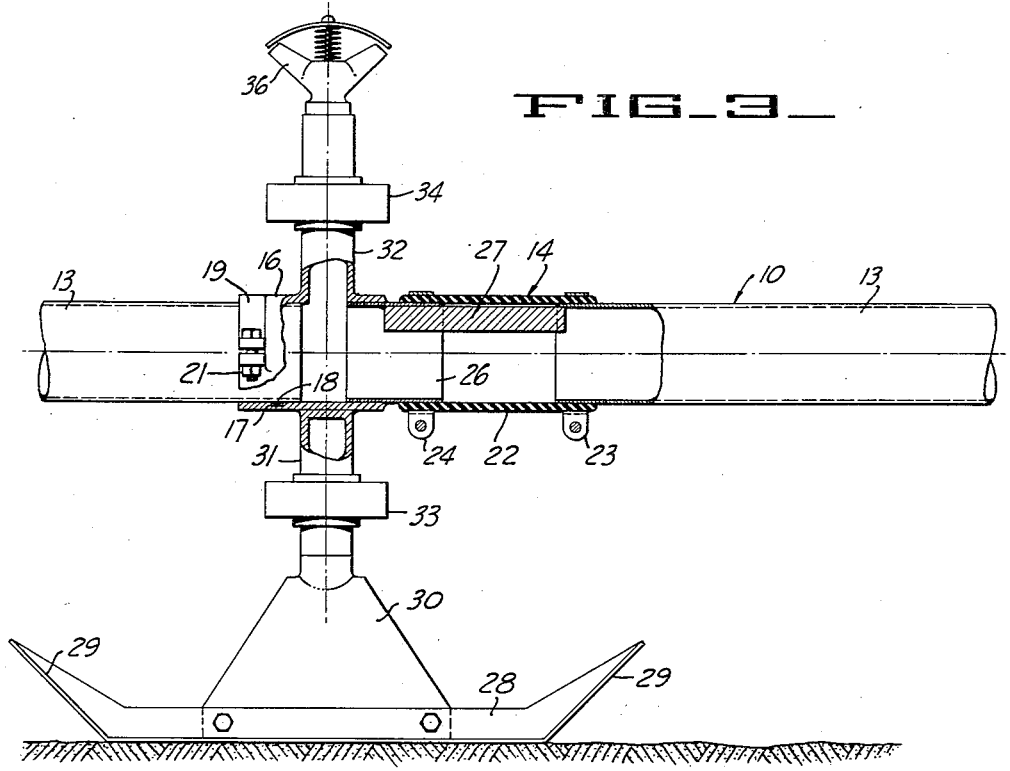
FIG_3_
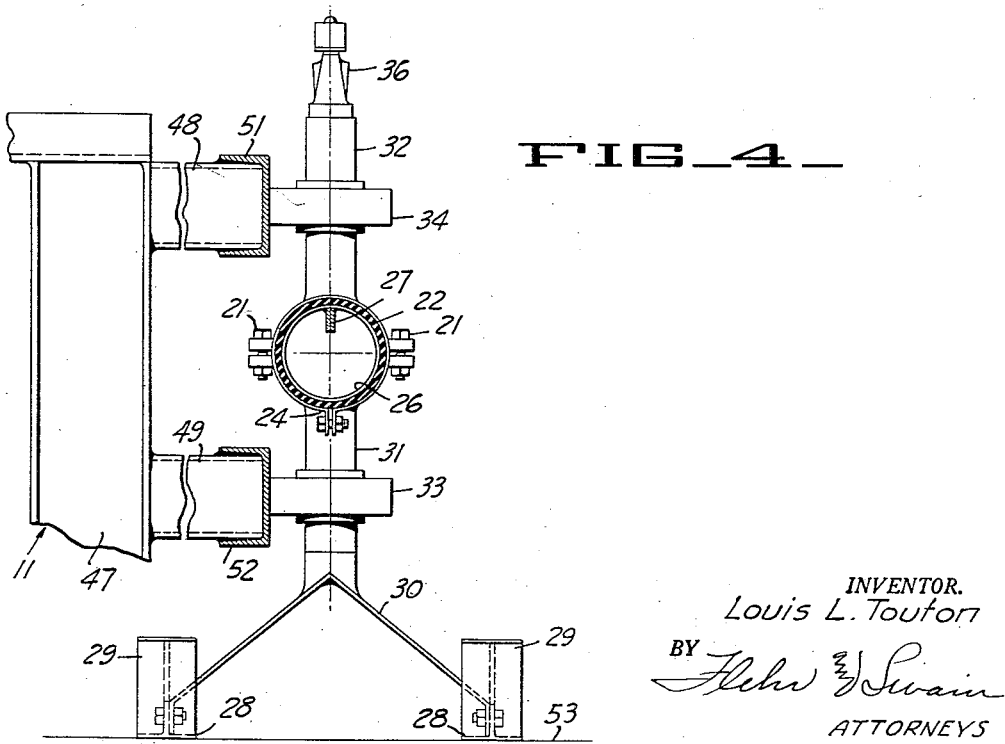
FIG_4_
INVENTOR.
Louis L. Touton
BY
ATTORNEYS

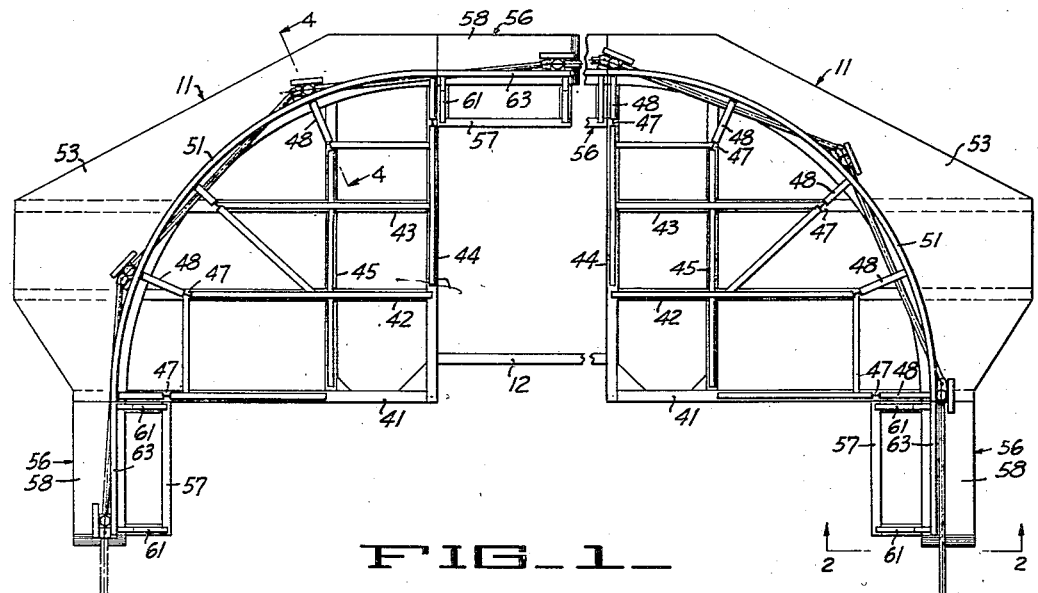

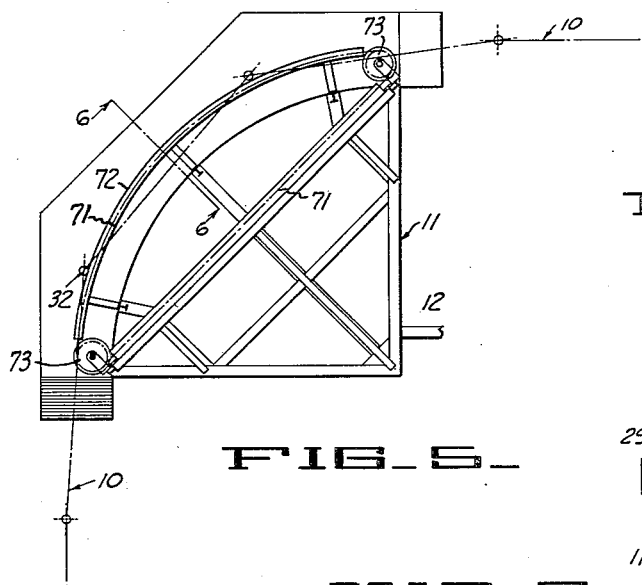
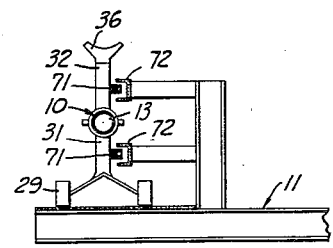
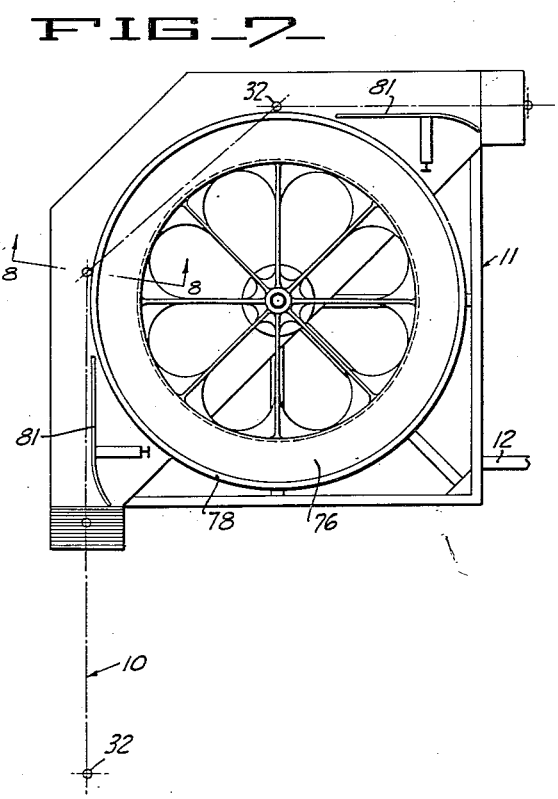
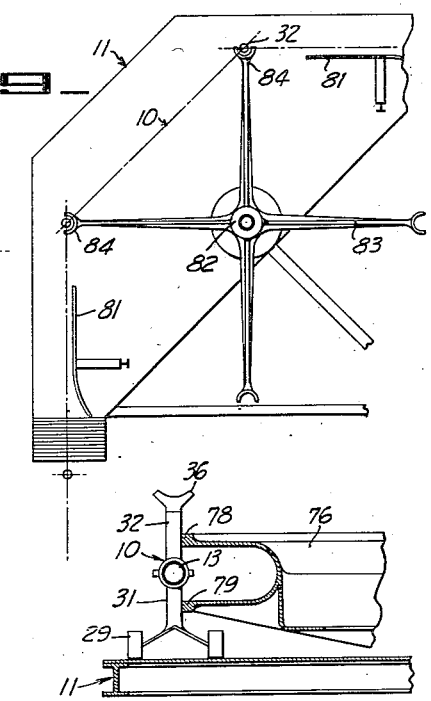
INVENTOR.
Louis L. Touton
ATTORNEYS

United States Patent Office 2,803,498
Patented Aug. 20, 1957

2,803,498

AGRICULTURAL IRRIGATING SYSTEM

Louis L. Touton, Fresno, Calif.

Application February 16, 1953, Serial No. 337,202

15 Claims. (Cl. 299—47)

This invention relates generally to agricultural irrigating systems and particularly to systems of the overhead sprinkling type making use of piping disposed above the ground.

Irrigating system of the above type commonly employ a length of sprinkler piping comprising rigid pipe sections connected by couplers. At one end of the piping, means is provided for making connection with a source of water under pressure. The sprinkler heads are distributed along the length of the piping and serve to cover the area to be irrigated. When the irrigation of one area has been completed, the piping is shifted to another position to irrigate an adjacent area. Thus the piping may be shifted many times to irrigate a given field.

A number of expedients have been employed to facilitate moving the piping from one location to another. Thus it is common to use quick detachable couplings between light weight (e. g. aluminum) pipe sections whereby the sections can be disconnected, moved by hand to a new location, and then reconnected. This is time consuming and requires a large amount of hand labor. In some instances the piping has been carried by wheels having their axes aligned with the axis of the pipe, whereby the entire length of piping can be moved as a unit laterally of its axis. One such system employs wheels having a diameter of about six feet, and rigidly secured at spaced points to the sprinkler pipe. The pipe is of relatively large diameter whereby torque applied at a point intermediate its length is transmitted to all of the wheels. Power means serve to apply turning torque to the pipe whereby all of the wheels are rotated simultaneously to advance the pipe in a direction at right angles to its axis. This type of system is expensive because of the high cost of the wheels and other mechanism required and because relatively large piping must be employed to transmit torque from one end to the other. It operates reasonably well on broadcast or drilled crops where the growth is short and precision of movement is not important, as for example on alfalfa and permanent pastures. However, such equipment is not suitable for row crops because of the difficulty involved in tracking all of the wheels in the spaces between the plant rows. Also it is not suitable where its use involves movement of the wheels over plants of considerable size because of plant breakage or other injury.

In addition to the types of equipment described above, it has been proposed to support the piping on wheels or skids, and to drag it lengthwise from one position to another. Prior systems of this character have not solved the problem of enabling accurate positioning of the piping as desired in the growing of row crops, or shifting from one position to another with utilization of only a small amount of field space. In some instances ground stakes have been used to advantage, but they have not made possible a wide latitude of shifting action, and they have required movement over relatively large field areas to obtain a given shift in position. Therefore this system has been used only to a limited extent to avoid conventional hand shifting.

It is an object of the present invention to provide a new irrigating system involving pulling the piping lengthwise to shift it from one position to another and which overcomes the inherent defects and disadvantages of other systems as outlined above.

Another object of the invention is to provide a system of the above character which makes possible rapid and accurate positioning of the piping in successive locations with a minimum of labor and by the use of relatively simple equipment.

Another object of the invention is to provide a system of the above character which is not severe upon the piping or coupling means, and which makes possible the use of standard light weight piping of moderate diameter.

Another object of the invention is to provide a system of the above character making possible movement of piping from one position to another without utilizing field spaces of excessive size, and without injury to growing crops.

Additional objects and features of the invention will appear from the following description in which the preferred embodiments of the invention have been set forth in detail in conjunction with the accompanying drawing.

Referring to the drawing:

Figure 1 is a plan view illustrating an irrigation system incorporating the present invention.

Figure 2 is a cross-sectional detail on an enlarged scale taken along the line 2—2 of Figure 1.

Figure 3 is a side elevational view, partly in cross-section, and on an enlarged scale, illustrating a portion of the piping together with the associated coupling means.

Figure 4 is a cross-sectional view taken along the line 4—4 of Figure 1 and on the same scale as Figure 3.

Figure 5 is a plan view illustrating another embodiment of the guide means.

Figure 6 is a cross-sectional detail on an enlarged scale taken along the line 6—6 of Figure 5.

Figure 7 is a plan view illustrating another embodiment of the guide means.

Figure 8 is a cross-sectional view on an enlarged scale taken along the line 8—8 of Figure 7.

Figure 9 is a plan view illustrating another type of guide means which can be employed.

In Figure 1 I have schematically illustrated a length of sprinkler piping 10 extending laterally across a field to be irrigated. In a typical instance it is desirable to shift the piping from the position shown in solid lines (position 1) to the position shown in dotted lines (position 2). Thereafter it may be necessary to shift the piping a number of times to complete irrigation of an entire field. In accordance with the present invention, I utilize guideway means which is located along one side of the planted field area, and which cooperates with the piping, when the piping is pulled lengthwise into cooperative relationship with the same. The guideway means directs the piping to a new location, such as the position 2, after which the guideway is shifted to enable a subsequent change in position from the position 2, to position 3, etc. For convenience, the guideway is in two units 11, which can be held in spaced relationship by suitable means such as the connecting bar or other structural member 12.

A suitable construction for the piping 10 and its associated parts is illustrated in Figures 3 and 4. I employ relatively rigid pipe sections 13 which have their ends constructed together by coupling means 14. Each coupling means is constructed to permit a substantial amount of articulation between the sections, as for example whereby any one section can swing through an arc of about 60° with respect to the adjacent section. Also it is desirable for each coupling means to be associated with means for supporting the piping at an elevation above the ground, and also with a suitable sprinkler head. In the arrangement illustrated in Figure 3, the coupling means consists of a metal sleeve 16 within which one may insert one end of a pipe section 13. The sleeve has an internal groove 17 to accommodate a seal ring 18, which can be of the resilient O-ring type. It is interrupted to accommodate the half cylindrical clamping band 19, which can be clamped against the pipe by tightening the bolts 21.

The adjacent pipe section is coupled to the sleeve 16 by suitable means permitting a substantial amount of articulation such as the rubber hose or tube 22. This hose is shown being secured by clamping bands 23 and 24, to the adjacent piping section 13, and to the metal sleeve extension 26. In order to minimize sagging, I can provide suitable supporting means such as the bar 27. This bar is attached to the upper wall of the sleeve extension 26, and extends through the hose 22, and for a short distance into the end of the adjacent pipe section 13.

The ground engaging means associated with the coupling means can consist of the skids or runners 28, which have upturned end portions 29, and which are carried by suitable mounting means, such as the webs or plates 30. The plates 30 are rigidly attached to the lower end of a rod or tube 31, which in turn has its upper end rigidly secured to the sleeve 16. The skids or runners 28 extend in a direction parallel to the length of the pipe, and serve to support the piping at a desired elevation above the ground.

The sleeve 16 also carries a tube or pipe 32 which extends in alignment with the tube 31. Free running rollers 33 and 34 are mounted upon the members 31 and 32, and serve to engage guideway members as will be presently explained. A suitable sprinkler head 36 is shown mounted upon the upper end of tube 32. The passage through this tube conducts water from the sleeve to the sprinkler head. Any passage provided by tube 31 is blocked.

It will be evident that by use of the means illustrated in Figure 3 and 4, between each section of the piping the entire length of piping is supported at a desired elevation above the ground, and a sprinkler head is associated with each coupling means. The coupling means at one end of the piping can be adapted for connection with a source of water under pressure. The coupling device located at the other end of the piping can be closed. Assuming that the hose sections 22 are of proper strength, the entire length of piping can be dragged lengthwise by attaching a towing rope or like means to one end of the same.

It is desirable for each pipe section to be provided with one or more automatic drain valves (not shown) which automatically close when water is being pumped to the piping, but which open automatically to permit water within the piping to drain out when the pressure is reduced to substantially atmospheric. One such drain valve can be mounted midway between the ends of each pipe section, and on the lower side.

A suitable guideway unit is illustrated in Figures 1 and 2, inclusive. It consists in this instance of the lower horizontal frame members 41, 42 and 43, which extend at right angles to and are cross-connected to the lower frame members 44 and 45. This framing serves to support the braced upright posts 47, which in turn carry the vertically spaced arms 48 and 49. Curved guideway members 51 and 52 are secured to the extremities of arms 48 and 49, and can be made of suitable structural shapes, such as steel channels or angles. Below the guide members 51 and 52 the frame members serve to support the metal flooring 53. If desired the unit can be provided with retractable wheels or skids to facilitate movement from one position to another. Also it can be provided with suitable means for anchoring it in the desired field location, as for example, retractable stakes or spuds for engaging the ground.

In addition to the main parts of the guide unit described above, which provide a curved guideway portion, it is desirable to provide supplemental entrant and discharge guideway portions at the ends of the curved guideway. Such guideway portions can be carried by separate units 56. Each such unit can have a frame comprising the lower structure members 57, which carries the flooring 58, and the vertical posts 59. The arms 61 and 62, carried by the posts 59, serve to support the substantially straight guide members 63 and 64. When bolted or otherwise secured to the main guideway unit, these guideway members 63 and 64 are aligned with the ends of the curved guide members 51 and 52.

It has been found satisfactory to make the guideway members 63 and 64 substantially straight and of a length about equal to one-half the length of the pipe sections employed. Also it is satisfactory for the curved guideway members 51 and 52 to have a radius ranging from about 70% of the length of each section to about twice such length.

Operation of my system is as follows: Assuming that it is desired to shift the piping 10 from position 1 to position 2, (Figure 1), the two units 11 are positioned alongside the planted field as illustrated in Figure 1, and the spacer member 12 is of a length depending upon the distance desired between the two positions. A tow rope, chain or cable is now attached to one end of the piping, and the other end attached to a suitable appliance, such as a small tractor. The tractor proceeds to pull the piping lengthwise into cooperative relation with the adjacent unit 11 with the skids riding over the flooring and with rollers 33 and 34 being moved along the guideway members 63 and 64. As the advancing coupling means proceeds into the curved portion of the guideway, the tractor makes a turn, and then proceeds toward and about the other unit 11. After the advancing coupling means has progressed well about the curved guideway of the second unit 11, the tractor advances across the field in line with the desired position. While advancing about the curved guideways, the axes of the individual pipe sections extend as chords between the coupling means and the articulation between the pipe sections is about vertical axes corresponding generally to the axes of the rollers 33 and 34. The guideway portions 56 confine the coupling means to substantially straight paths, as they enter and leave the curved guideway portions, and thus serves to prevent any tendency for the piping extending toward and away from the units from being dragged sideways. When the piping has cleared the second of the two guideways 11, it is in the second position, and then the tow rope is disconnected and the piping connected to the source of water under pressure. When the area surrounding the second position has been irrigated, the units 11 are shifted to a new location whereby the process can be repeated to shift the piping to third position.

The system and apparatus described above has many desirable features and advantages. Shifting the piping from one position to another requires a minimum of time and labor, and does not cause any undue wear upon the pipe sections or the associated coupling means. The guideway means are not unduly complicated or expensive, and they can be readily shifted from one position to another, as the occasion demands. Relatively light weight aluminum pipe sections of moderate diameter can be used, because these sections are not subject to undue stresses or wear. While passing in cooperative relation with the guideway the pipe sections do not touch or rub against the track or frame members, but are disposed between the track members and the arms 61 and 62. Also, the piping and the coupling devices are retained against turning about their axes, because the rollers provide points of contact with the guideway located on opposite sides of the coupling means. The positioning of the piping with my system is relatively accurate and the spacing between positions can be adjusted as desired, by changing the spacing between the guideway units.

If in some instances it is desired to move the piping from a first to a second position, at right angles to the first, rather than parallel, this can be done by using a single guideway unit. If it is desired to move a length of piping from one field to an adjacent field, but with simultaneous lateral displacement, this can be done by placing two of the guideway units in cooperative relation to form a substantially S-shaped guideway.

It will be evident that the structural features of my invention can be modified in various respects without departing from the invention. For example, instead of providing the rollers 33 and 34 upon the members 31 and 32, the guideway can be provided with anti-friction means, such as closely spaced or overlapping rollers. Also it is possible to provide the guideway with endless belts or chains, which can engage sprockets at the end of the guideway. Thus, as shown schematically in Figures 5 and 6, endless chains 71 can be arranged to operate within the channel-shaped guide means 72, and may engage sprockets 73. The chain may vary in detail but preferably is constructed to facilitate engagement with the members 31 and 32 of the coupling means.

Another modification which can be employed is to utilize a wheel or sprocket for forming the curved portion of the guideway. Thus, as schematically illustrated in Figures 7 and 8, I have provided a wheel 76 of suitable diameter which is journaled to a suitable frame, and which carries vertically spaced peripheral members 78 and 79 for engaging with the members 31 and 32 of the coupling means. To facilitate movement of the coupling means into and out of engagement with the peripheral members 78 and 79, I can provide vertically spaced and stationary guide members 81 which extend tangentially from the wheels 76.

Another type of guideway is illustrated schematically in Figure 9. In place of the wheel 76 of Figures 7 and 8, I provide a hub 82 which is journaled on a vertical axis, and which carries the radially extending arms 83. Each arm carries a pair of vertically spaced forks 84 at its extremity, and these forks are arranged to engage the members 31 and 32. The linear chord distance between the forks of adjacent arms is substantially equal to the length of one pipe section. It will be evident that this modification operates in substantially the same manner as the embodiment of Figures 7 and 8.

In some instances it may be desirable to employ wheels in place of the skids 28. Also, while it is desirable for rollers 33 and 34 to be located above and below the piping, it will be evident that they can be spaced horizontally and located on opposite sides of the piping, provided the guideway is modified accordingly.

The use of curved guideway members has been found desirable particularly in that they facilitate a smooth movement of the piping from one position to another. It is possible however to use substantially straight guideway portions connecting the entrant and discharge units, provided the angular relation between the guide members does not cause the annular movement between adjacent pipe sections to exceed that permitted by the coupling means.

It will be evident from the foregoing that I have provided an irrigating system and apparatus which can be used to advantage for carrying out irrigating methods of the overhead sprinkling type, and which will greatly facilitate movement of the piping from one position to another as desired.

I claim:

1. In agricultural irrigating apparatus, a plurality of rigid pipe sections, coupling means connecting the adjacent ends of the pipe sections to form a length of piping adapted to extend along a desired field position, said coupling means permitting articulation between the sections, and guide means adapted to occupy a fixed location upon the ground and serving to form a guide for the piping to transpose the piping to another field area responsive to pulling the piping lengthwise relative to said means, said guide means including entrant and discharge guide portions and a main guide portion extending between said entrant and discharge guide portions and serving to effect a change in direction of movement of the piping as the piping is pulled lengthwise relative to the guide means, said entrant and discharge portions serving to guide the piping for lengthwise movement substantially in line with the directions with which the piping approaches toward and is discharged from the guide means.

2. In agricultural irrigating apparatus, a plurality of pipe sections, coupling means connecting the adjacent ends of the pipe sections to form a length of piping adapted to extend over the ground along a desired field position, said coupling means permitting articulation between the sections, guide means for transposing the piping to another field position transposed laterally from the first position and responsive to pulling the piping lengthwise in cooperative relation with said guide means, and means carried by the pipe sections adjacent said coupling means for engaging said guide means.

3. In agricultural irrigating apparatus, a plurality of pipe sections, coupling means connecting the adjacent ends of the pipe sections to form a length of piping adapted to extend over the ground along a desired field position, said coupling means permitting articulation between the sections, guide means for transposing the piping to another field location which is displaced laterally from the first position when the piping is pulled lengthwise in cooperative relation with said guide means, and means carried by the coupling means for engaging said guide means at points located on opposite sides of the piping.

4. In agricultural irrigating apparatus, a plurality of relatively rigid pipe sections, coupling means connecting the adjacent ends of the pipe sections to form a length of piping adapted to extend along a desired field position, said coupling means permitting articulation between the sections, guide means for transposing the piping to another field position responsive to pulling the piping lengthwise and in cooperative relation with the said guide means, means carried by the piping adjacent the ends of the pipe sections for engaging said guide means at points located on opposite sides of the piping, and ground engaging means carried by the pipe sections and serving to support the same at a desired elevation.

5. In agricultural irrigating apparatus, a plurality of pipe sections, coupling means connecting the adjacent ends of the pipe sections to form a length of piping adapted to extend along a desired field position, said coupling means permitting articulation between the sections, guide means for transposing the piping to another field position responsive to pulling the piping lengthwise in cooperative relation with said guide means, said guide means including a main guideway portion and entrant and discharge guideway portions extending from the ends of the main portion, and means carried by the pipe sections adjacent the ends thereof for engaging said guide portions, said guide portions being formed to permit articulation between said sections as the piping is moved in cooperative relation therewith, said entrant and discharge portions serving to guide the piping for lengthwise movement substantially in line with the directions with which the piping approaches toward and is discharged from the guide means.

6. Apparatus as in claim 5 in which the means carried adjacent the ends of the pipe sections provides points of engagement with said guide portions located above and below the piping.

7. Apparatus as in claim 5 in which the piping is provided with means adjacent the ends of the pipe sections serving to engage said guide portions at points located on opposite sides of the piping, and in which means is provided for supporting the piping at an elevation above the ground.

8. In agricultural irrigating apparatus, a length of piping adapted to extend along a desired field position, said piping comprising straight pipe sections and coupling means forming articulated connections between the adjacent ends of the pipes, and structural guide means for transposing the piping to another field position displaced laterally from its previous position, when the piping is pulled lengthwise over the ground relative to the guide means, said guide means including entrant and discharge guide portions and a main guide portion extending between said entrant and discharge guide portions and serving to effect a change in direction of movement of the piping as the piping is pulled lengthwise relative to the guide means, said entrant and discharge portions serving to guide the piping for lengthwise movement in line with the general directions with which the piping approaches toward and is discharged from the guide means, all of said guide portions extending above the ground level.

9. In agricultural irrigating apparatus, a plurality of rigid pipe sections, coupling means connecting the adjacent ends of the pipe sections to form with the pipe sections an elongated structure adapted to extend along a desired field position, said coupling means permitting articulation between the pipe sections, guide means for transposing the structure to another field position spaced laterally from the first position and responsive to pulling the structure in the direction of its length in cooperative relation with said guide means, said guide means providing a guideway formed to change the direction of movement of the structure and engaging the structure at regions located adjacent the ends of the pipe sections and spaced longitudinally of the structure.

10. Apparatus as in claim 9 in which means is carried by each of said coupling means for engaging said guideway.

11. Apparatus as in claim 9 in which means is carried by the coupling means for engaging said guideway at vertically aligned points located above and below the piping.

12. In agricultural irrigating apparatus, an elongated structure comprising a plurality of rigid pipe sections and coupling means connecting the adjacent ends of the pipe sections to form a length of piping adapted to extend along a desired field position, said coupling means permitting articulation between the sections, and guide means adapted to occupy a fixed location upon the ground and serving to form a guide for said elongated structure to transpose it to another field area responsive to pulling the same lengthwise relative to said guide means, said guide means having regions of engagement with said elongated structure which are adjacent the ends of the pipe sections and being formed to accommodate articulation between the pipe sections as said elongated structure is moved relative thereto.

13. Apparatus as in claim 12 in which the guideway means engages said elongated structure at points located on opposite sides of the piping in said regions, whereby the pipe sections are restrained from turning about their axes.

14. In agricultural irrigation apparatus, an elongated articulated structure comprising a plurality of rigid pipe sections and coupling means forming articulated connections between the adjacent ends of the pipe sections to provide a length of piping adapted to extend along a desired field position, and structural guide means adapted to be disposed at a fixed location on the ground for transposing the piping to another field location responsive to pulling the structure lengthwise over the ground in cooperative relation to said guide means, said guide means having means for progressively engaging and disengaging said articulated structure successively as the structure is so pulled, the engagement being in a plurality of regions spaced lengthwise of the structure and fixed relative to the length of the structure during engagement.

15. Agricultural irrigation apparatus as in claim 14 in which said structural guide means restrains said articulated structure against turning about the axis of the same, in said regions of engagement.

References Cited in the file of this patent

UNITED STATES PATENTS

| | | |
|---|---|---|
| 625,920 | Ballerstedt | May 30, 1899 |
| 664,240 | Doehring | Dec. 18, 1900 |
| 1,658,202 | Jones | Feb. 7, 1928 |
| 2,249,211 | Johnson | July 15, 1941 |
| 2,642,311 | Beyer | June 16, 1953 |

FOREIGN PATENTS

| 144,509 | Switzerland | Jan. 5, 1931 |